United States Patent [19]

Waag

[11] 3,987,774
[45] Oct. 26, 1976

[54] SUPPLEMENTARY FUEL INJECTION APPARATUS FOR THE INTERNAL COMBUSTION ENGINE

[76] Inventor: Norman E. Waag, 3110 Broadview Road, Cleveland, Ohio 44109

[22] Filed: Nov. 26, 1975

[21] Appl. No.: 635,617

[52] U.S. Cl. .................. 123/139 AJ; 123/25 R; 123/25 J
[51] Int. Cl.² ............... F02D 19/06; F02D 39/00
[58] Field of Search ............ 123/1 A, 25 A, 25 R, 123/25 E, 25 F, 25 M, 25 Q, 139 AH, 139-AJ, 127, 25 J

[56] References Cited
UNITED STATES PATENTS

| | | | |
|---|---|---|---|
| 2,079,858 | 5/1937 | Horton | 123/139 AH |
| 3,800,770 | 4/1974 | Baribeau | 123/39 AJ |
| 3,911,871 | 10/1975 | Williams et al. | 123/25 M X |

Primary Examiner—William R. Cline

[57] ABSTRACT

A supplementary fuel injection apparatus for an internal combustion engine comprising a pressure type fuel reservoir member having pressure supplied by the engine exhaust gas, a chambered fuel pump and metering regulator member tubularly connected to said reservoir and having a fuel chamber and a vacuum chamber, a diaphragm therebetween, diaphragm fuel pump means in said vacuum chamber that is power actuated by vacuum pressure supplied from the engine intake manifold, and a fuel distribution unit having a fuel passage connected to said fuel pump and metering regulator unit and the carburetor of the said engine and said unit having a fuel control means therealong and a variable fuel pressure metering means mounted on the carburetor adjacent the venturi thereof.

6 Claims, 2 Drawing Figures

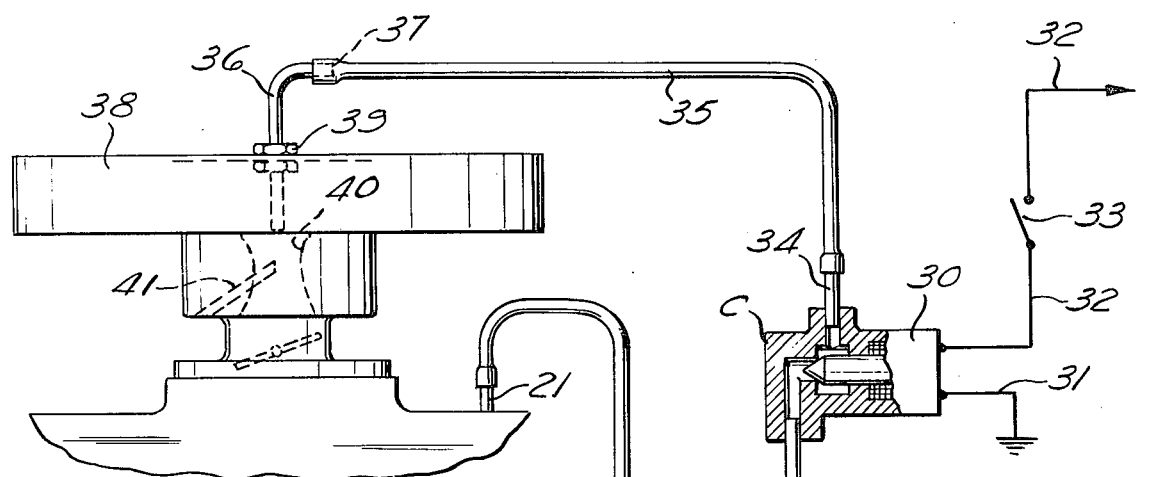
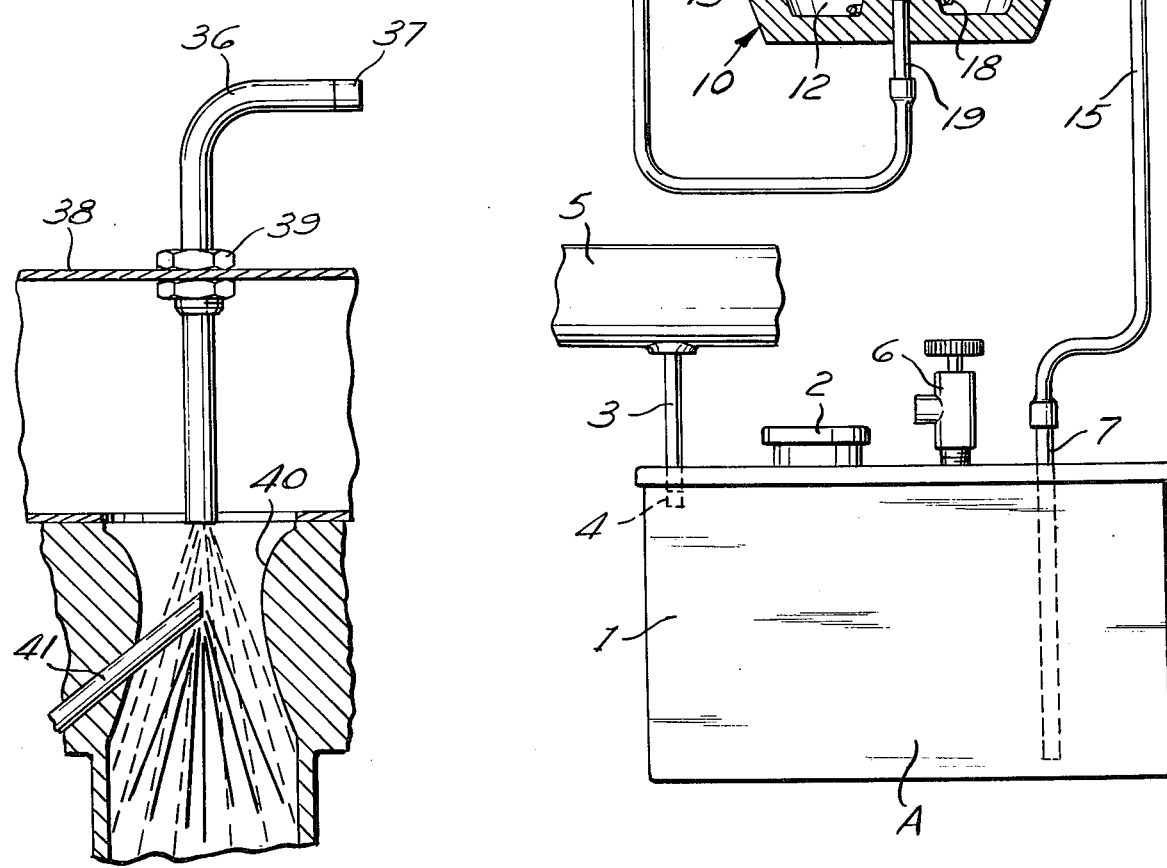

SUPPLEMENTARY FUEL INJECTION APPARATUS FOR THE INTERNAL COMBUSTION ENGINE

FIELD OF THE INVENTION

This invention relates primarily to the art of apparatus relating to the use of supplementary motor fuels and more particularly to apparatus to provide for the improvement in the work efficiency, detonation control and economy of the fuel used in the internal combustion engine and thereby reducing the air pollution and output of oxides of nitrogen, carbon monoxide and hydrocarbons.

DESCRIPTION OF THE PRIOR ART

The prior art which is known in the field of apparatus for use of motor fuels for internal combustion engines are U.S. Pat. No. 1,504,837 to Ricardo for "Fuel for Use in Internal Combustion Engines"; U.S. Pat. No. 1,684,686 to Records for "Aqueous Liquid Fuel"; U.S. Pat. No. 2,404,094 to Robertson for "Motor Fuels"; U.S. Pat. No. 2,429,707 to Catalano for "Supplementary Fuel" and U.S. Pat. No. 2,504,361 to Van Hartesveldt for "Supplementary Fuel."

SUMMARY OF THE INVENTION

In contrast with the prior apparatus used for providing supplementary motor fuels in the field of internal combustion engines, the present invention avoids the disadvantages found in such apparatus in the following respects, among others: The combination of the invention includes a pressure type fuel reservoir mounted adjacent the engine carburetor and having a direct exhaust gas passage tube connection with the engine exhaust manifold to provide pressure in said reservoir.

The invention also provides a fuel pump and metering apparatus having a housing, a fuel chamber and a vacuum chamber therein, an elastomeric diaphragm pressure pump forming a wall between said chambers and with pump control means therefor in said vacuum chamber, said vacuum chamber having a direct tubular passage to the engine intake manifold to provide a vacuum condition from said manifold to said vacuum chamber. The said fuel chamber having a fuel inlet port and a fuel outlet port in the wall thereof with a fuel metering control means mounted in each said port. The said inlet port having a direct fuel passage connection with said reservoir.

The invention further provides a fuel passage distribution member connected to said fuel pump outlet port having a safety shut-off valve means and a nozzle and fuel pressure metering means mounted on the engine carburetor adjacent the venturi thereof.

An important advantage of this invention over the prior art is found in improved apparatus wherein the combustion temperature of the internal combustion engine is lowered to a level below the fixation point of oxides of nitrogen, namely, 2800° F., by forcibly injecting an amount of water alcohol through a nozzle coaxially directed into the carburetor venturi, which is adequate to prevent fixation of said $NO_2$.

Another important advantage of this invention over the prior art is found in improved apparatus which provides the exhaust gas pressure to produce a uniform and metered injection of supplementary fuel for the internal combustion engine during constant torque operation and which holds the diaphragm pump action inactive during the period of high or low vacuum in the vacuum chamber, thereby causing dominant exhaust pressurized fuel to pass through the fuel chamber thereof and thereon to a coaxial nozzle and carburetor.

Another advantage of this invention is found in apparatus which controls and improves the burning rate of the gasoline to meet the requirements of the engine. During conditions of low R.P.M. and high torque the vacuum actuated diaphragm pump meters and delivers a quantity of water alcohol to the nozzle and thereon to the carburetor venturi, raising the octane rating of the gasoline and slowing down the burning rate of said gasoline, thereby permitting the gasoline to burn more completely.

Another advantage of this invention is found in apparatus which injects water alcohol through a coaxially directed nozzle into the carburetor venturi where said water alcohol immediately changes to tiny droplets and mixes uniformly with the tiny droplets of gasoline in said carburetor venturi.

Other advantages more or less ancillary to the foregoing will appear in the following detailed description of the preferred embodiments as applied illustratively to a supplementary fuel injection apparatus for an internal combustion engine.

BRIEF DESCRIPTION OF THE DRAWINGS

The invention is illustrated in the drawings in which conventional parts are omitted or merely indicated to clarify the specification.

In the drawing:

FIG. 1 is a schematic elevational view of the entire assembly of the supplementary fuel dispensing apparatus, with parts shown in cross section, and including cutaway portions of the engine carburetor and air cleaner and its intake and exhaust manifolds; and FIG. 2 is an enlarged fragmentary sectional view of the carburetor venturi and nozzles of FIG. 1 and showing the nozzle injecting supplementary fuel therein.

THE PREFERRED EMBODIMENT

By reference to the drawing it will be seen that there are three principal members of the invention, namely, the pressure type fuel reservoir apparatus A, the diaphragm fuel pump and metering apparatus B and the fuel distribution apparatus C.

With respect to my disclosure of the preferred embodiment the word "vacuum" is used to mean a pressure less than or lower than atmospheric pressure, and the words "exhaust gas" to mean a pressure over and above atmospheric pressure.

Referring now more particularly to FIG. 1, the fuel reservoir apparatus, member A includes a pressurized type fuel reservoir 1, having a fuel receiving opening 2 therein, an exhaust gas passage tube 3 mounted in the wall thereof and having an exhaust gas flow control means 4 mounted thereon, the said tube 3 extending to and connected with the engine exhaust manifold 5, the said reservoir 1 having an exhaust pressure regulator 6 mounted thereon and a fuel passage tube outlet 7 mounted adjacent thereto and having its open end adjacent the bottom wall of the reservoir 1.

The diaphragm fuel pump and metering apparatus member B includes a chambered housing 10 defining a fuel pressure chamber 11 and a vacuum chamber 12, and having an elastomeric noncorrosive diaphragm 13 mounted in said housing 10 between said fuel chamber 11 and vacuum chamber 12 and forming a common wall for said chambers and providing fuel pump means therefor, metering fuel control means mounted in said fuel chamber 11 including an inlet fuel check valve 14 mounted in a port of said housing 10 and having a fuel passage tube 15 connection to said tube 7 and a fuel outlet check valve 16 mounted in a port of said housing 10 adjacent to said check valve 14 and having a fuel passage tube 17 therefrom.

The vacuum chamber 12 includes a calibrated spring 18 mounted therein which actuates and controls the diaphragm 13 in its pump action, a vacuum passage tube 19 mounted in the housing wall of said vacuum chamber 12 and having a vacuum passage tube 20 connected thereto, and to the engine intake manifold 21.

Referring now to FIGS. I and II, the fuel distribution apparatus member C includes an electric safety shut-off valve 30 connected to said passage tube 17 from said fuel outlet check valve 16, the said electric safety shut-off valve 30 having one wire 31 grounded and the other wire 32 extending to the engine ignition switch (not shown) and said wire 32 having a kill switch 33 mounted thereon to open or close the electric circuit when desired. The electric safety shut-off valve 30 having a tubular outlet fuel passage 34 and a tubular fuel passage 35 mounted thereon and extending to the engine carburetor and connected to nozzle 36 mounted thereon. The said nozzle 36 having a variable fuel pressure metering means 37 contained therein adjacent the said tubular passage 35. The said nozzle 36 as shown in FIGS. I and II is mounted in the carburetor air cleaner 38 by guide 39 coaxially positioned adjacent to and above the throat of the carburetor venturi 40. The engine carburetor main fuel nozzle 41 is shown at throat of said carburetor having its outlet in alignment with outlet of said nozzle 36.

As shown in FIG. II, the dotted lines from the nozzle 36 indicate water alcohol vapor spray intermingling with gasoline vapor spray solid lines from the said carburetor main engine fuel nozzle 41.

OPERATION

In operation, the apparatus of the invention begins to function when the operator starts the engine and the supplementary fuel such as water alcohol is contained in the reservoir 1. It may be seen that the engine immediately creates a vacuum in its intake manifold and an exhaust gas pressure in its exhaust manifold and that the said vacuum and said exhaust gas pressure varies with the torque requirements of the engine.

The apparatus of the invention has a fluid passage connection to said manifold and it uses said vacuum and exhaust gas. It provides a vacuum passage tube 19 and 20 connecting the intake manifold 21 with the vacuum chamber 12 and an exhaust gas passage tube 3 connecting the exhaust manifold 5 with the fuel reservoir 1.

The various functions performed by said apparatus under the operator's control include the following:

Charging the Fuel Chamber

The supplementary fuel is brought to the fuel chamber 11 for use and consists of charging the said fuel chamber 11 with supplementary fuel from said reservoir 1. This is accomplished as the vacuum in the vacuum chamber 12 builds up sufficiently high to overcome the pump spring 18 of the diaphragm pump and thus causes the diaphragm to depress into the vacuum chamber 12. This action of the diaphragm 13 creates a vacuum in the adjacent fuel chamber 11 and which will be overcome as said vacuum draws a charge of supplementary fuel into the said chamber from the fuel reservoir 1 through the fuel outlet 7 and fuel passage 15 and thereon through the fuel inlet check valve 14. The exhaust pressure in the reservoir 1 is available to aid the flow of said fuel into said fuel chamber 11. During said operation the fuel outlet check valve 16 remains closed.

After the said fuel chamber 11 has been charged the said supplementary fuel is discharged therefrom to the engine carburetor as follows:

For High Torque Requirements

When the vacuum from the intake manifold 21 is reduced during periods of high torque requirements with part or open throttle valve conditions, pump spring 18 overcomes the reduced vacuum in the vacuum chamber 12 urging said diaphragm 13 against the supplementary fuel charge in the fuel chamber 11 closing inlet check valve 14 and forcing said supplementary fuel through outlet check valve 16 through tube passage 17 through shut-off solenoid 30 through tube passage 35 to metering jet 37 and nozzle 36 and finally into carburetor throat and thereon to venturi 40.

For Low Torque Requirements

When the operator has increased the engine RPM the vacuum decreases and the pump spring 18 thereby forces the diaphragm 13 to the end of its stroke, the exhaust in the engine exhaust manifold 5 builds up sending exhaust gas pressure through exhaust gas passage tube 3 into reservoir 1, pressurizing supplementary fuel therein and urging said supplementary fuel through reservoir outlet tube 7 through inlet fuel passage tube 15 forcing inlet check valve 14 open to permit pressurized supplementary fuel to enter fuel chamber 11 and thereon through outlet check valve 16 and thereon to said carburetor.

The operator may then set the throttle valve for steady RPM operation and obtain substantially the same result aided by the supply of supplementary fuel resulting from the dominant use of the exhaust gas pressure.

For Variable Torque Requirements

When the operator has a variable engine RPM requirement with a variable torque requirement with or without a variable throttle valve setting requirement, the apparatus of the invention will immediately supply the supplementary fuel to the engine carburetor as the engine transmits a dominant vacuum and/or a dominant exhaust gas condition to the diaphragm and metering apparatus of the invention.

During deceleration or idling the invention becomes inactive because the vacuum and exhaust gas conditions are minimal and it is imperative that no supplemental fuel be injected at such times.

Applicant's apparatus is therefore unique in the manner of delivering supplementary fuel to the carburetor of an internal combustion engine in its use of the above atmospheric pressure received from the engine's exhaust manifold and the use of the less than atmospheric pressure or partial vacuum pressure received from the engine's intake manifold when each said pressure is in dominance in the respective manifold.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in which is claimed.

What I claim is:

1. A supplementary fuel injection apparatus for an internal combustion engine comprising:
   a. a pressure type fuel reservoir member mounted adjacent the carburetor of the combustion engine and having therein a fuel receiving opening and fuel passage outlet, an exhaust gas passage tube from the engine exhaust manifold connected thereto, and exhaust gas pressure control means mounted thereon,
   b. a diaphragm fuel pump and metering regulator member, a chambered housing therefor and having therein a fuel chamber and a vacuum chamber, an elastomeric non-corrosive pressure action fuel pump diaphragm mounted in said housing between said fuel and vacuum chambers and forming a common wall for said chambers and fuel pump means therefor, and said fuel chamber having a fuel metering inlet and outlet control means mounted in ports in the housing wall thereof, said inlet means port having a fuel passage inlet tube mounted therein and connected to said reservoir fuel passage outlet, the said vacuum chamber having a diaphragm pump action control means mounted therein and a vacuum passage tube having one end mounted therein and the other end connected to the engine intake manifold to supply a less than air pressure vacuum power to actuate the said fuel pump diaphragm, and
   c. a fuel passage distribution member having a first fuel passage tube connected to said housing fuel outlet port, a fuel passage flow control means connected to said first fuel passage tube and mounted thereon, a fuel nozzle mounted on the engine carburetor adjacent the venturi thereof, a variable fuel pressure metering means connected to said fuel nozzle and a second fuel passage tube connected to said fuel passage flow control means and extending to a connection with said fuel nozzle, whereby said fuel passage distribution member provides a fuel passage for supplementary fuel from said housing of the diaphragm fuel pump and metering regulator member to the engine carburetor for the injection of said fuel into the carburetor venturi and for mixture with regular engine fuel brought thereto.

2. The supplementary fuel injection apparatus of claim 1 in which the reservoir exhaust gas pressure control means is a pop-off relief valve mounted thereon above the fuel level of the reservoir.

3. The supplementary fuel injection apparatus of claim 1 in which the fuel chamber's fuel metering inlet control means is a fuel inlet check valve and the outlet control means is a fuel outlet check valve thereby permitting the power stroke of the vacuum powered diaphragm pump to charge fuel into said fuel chamber and thereafter on the pump's return stroke to eject the fuel downstream therefrom to the engine carburetor in response to a variable vacuum present in the said vacuum chamber, and permitting the exhaust gas pressure in the fuel reservoir to cause a flow of fuel into and out of said fuel chamber downstream to the engine carburetor while the said diaphragm is at rest and the exhaust gas pressure from said engine is present in said reservoir.

4. The fuel injection apparatus of claim 1 in which the vacuum chamber diaphragm pump action control means is a calibrated spring mounted in the housing wall thereof and centrally abutting the diaphragm, the said spring having a compression factor sufficient to hold the diaphragm in its normal position when the vacuum is absent or low in said chamber and to permit the diaphragm to compress said spring when the vacuum therein is high whereby the volume in said chamber is reduced and thus creates a partial vacuum in the adjoining fuel chamber which in turn is overcome by receiving fuel from the reservoir.

5. The fuel injection apparatus of claim 1 in which the fuel passage flow control means in the fuel passage distribution member is an electric shut-off solenoid and a kill switch connected to the engine ignition.

6. The fuel injection apparatus of claim 1 in which the variable fuel pressure metering means in the fuel passage distribution member is a metering jet orifice attached to the nozzle adjacent the fuel tube connection thereof.

* * * * *